United States Patent Office 2,781,026
Patented Feb. 12, 1957

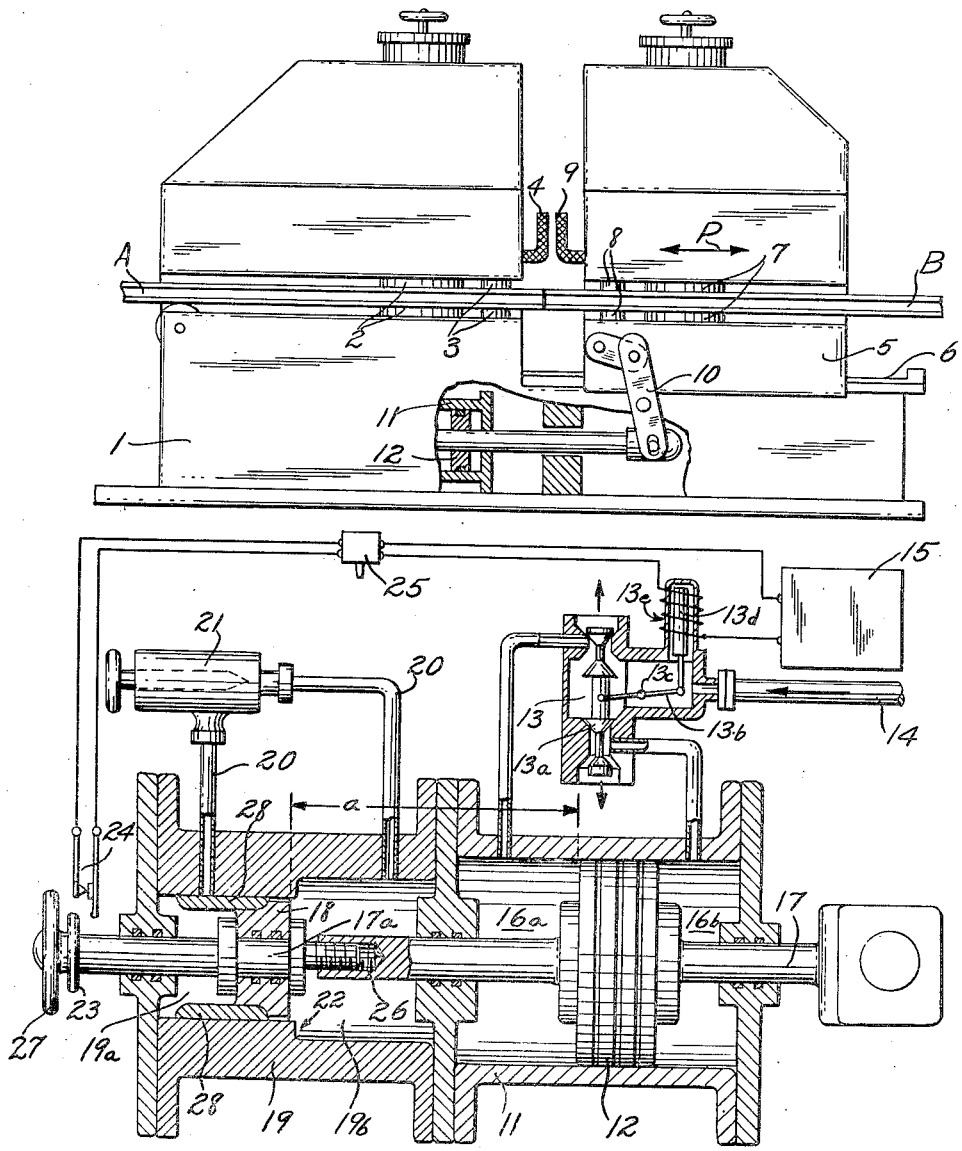

2,781,026

CONTROL APPARATUS FOR FLASH WELDING MACHINES

Hans Alfred Schlatter and Emil Wegmann, Zollikon-Zurich, Switzerland, assignors to Firma H. A. Schlatter A. G., Zollikon-Zurich, Switzerland Application June 18, 1954, Serial No. 437,672

Claims priority, application Switzerland December 30, 1953

7 Claims. (Cl. 121—45)

The present invention relates to flash welding apparatus.

More particularly, the present invention relates to a means for controlling the flash welding operations.

As is well known, when two parts are flash welded to each other, they are moved toward and away from each other several times to produce the heating of the portions to be welded together, and when these portions are sufficiently heated, the parts are suddenly pushed together with a large force so as to cause the heated portions thereof to fuse together.

One of the objects of the present invention is to provide an exceedingly simple apparatus for automatically causing the parts to be welded to be pushed together with a large force at the proper moment.

Another object of the present invention is to provide a simple adjusting means for regulating the moment at which the parts are suddenly pushed together at the end of the welding process.

A further object of the present invention is to provide a flash welding apparatus which will accomplish the above objects and which at the same time is very reliable in operation.

With the above objects in view the present invention mainly consists of a flash welding machine which includes a carriage means adapted to carry a work piece and a support means supporting the carriage means for reciprocating movement. A reciprocating means is operatively connected to the carriage means for reciprocating the latter, and a control means is operatively connected to the reciprocating means for giving the latter a stroke in one direction which is greater than its stroke in the reverse direction so that the carriage advances in one direction while being reciprocated. A brake means is operatively connected to the reciprocating means for breaking the movement thereof, and a release means is operatively connected to the brake means for substantially reducing the influence thereof on the reciprocating means when the carriage has been advanced to a predetermined extent so that the reciprocating means moves the carriage with a suddenly increased force upon release of the brake means.

The novel features which are considered as characteristic for the invention are set forth in particular in the appended claims. The invention itself, however, both as to its constructions and its method of operation, together with additional objects and advantages thereof, will be best understood from the following description of specific embodiments when read in connection with the accompanying drawings, in which:

Fig. 1 is a diagrammatic side view of a welding machine adapted to have the structure of the present invention applied thereto, part of Fig. 1 being broken away and being shown in section in order to correlate with Fig. 1 the structure of the invention illustrated in Fig. 2; and Fig. 2 shows partly schematically and partly in section the apparatus of the invention which is included in the welding machine of Fig. 1.

Referring now to the drawings, and to Fig. 1 in particular, it will be seen that the flash welding machine includes a support means in the form of a base 1 on which a stationary work piece A is clamped by any suitable clamping members 2, the members 3 engaging opposite faces of member A and serving to conduct electricity thereto, these members 3 being electrically connected in a known way to a conductor 4 which leads to an unillustrated welding transformer. The support means 1 is provided with guide ways 6 on which a carriage 5 is mounted for reciprocating movement in the direction of arrows P of Fig. 1. This carriage 5 carries the second work piece B which is fixed to the carriage by the members 7 and which has current delivered thereto by the members 8 which are electrically connected to the electrical conductive lead 9. The carriage 5 is connected through a suitable link to a lever 10 which is pivotally mounted intermediate its ends on the base 1, and the lower end of lever 10 is connected to a piston rod of a piston 12 which reciprocates within a cylinder 11 carried by the base 1, the lever 10 being provided with a slot through which a pin fixed to the piston rod extends, so that during reciprocation of the piston 12 the lever 10 is turned to reciprocate the carriage 5 and therefore reciprocate the work piece B with respect to the work piece A to carry out the flash welding operation.

As is apparent from Fig. 2, the piston 12 is fixed to a piston rod 17 which is in turn connected to the lever 10 for reciprocating the carriage 5. The interior of cylinder 11 is divided by piston 12 into a chamber 16a located to the left of piston 12 and a chamber 16b located to the right of piston 12. A valve 13 communicates through suitable conduits, as shown in Fig. 2, with the chambers 16a and 16b, respectively. A conduit 14 leads from a source of fluid under pressure, air in the example shown in Fig. 2, to the valve 13. As is apparent from Fig. 2, when the valve 13 is in the lower position shown in Fig. 2, the air under pressure will flow into the chamber 16a to move the piston 12 to the right, as viewed in Fig. 2, and chamber 16b will be connected by valve 13 with the atmosphere, whereas when this valve 13 is in its opposite upper position, as viewed in Fig. 2, conduit 14 will communicate with chamber 16b and chamber 16a will communicate with the atmosphere so that the piston 12 will be moved to the left, as viewed in Fig. 2. The movable valve member 13a of valve 13 is pivotally connected to one end of a lever 13b which is pivotally mounted intermediate its ends at 13c in the interior of the casing of valve 13, and the lever 13b is pivotally connected at its end distant from the valve member 13a to an armature 13d of a solenoid 13e connected electrically to an electronic device 15, of known structure, which periodically energizes the solenoid 13e. This timer 15 is set to energize the solenoid 13e for a shorter period of time than it is unenergized, and the solenoid is shown in Fig. 2 in its unenergized position, the weight of valve member 13a being sufficient to move the armature 13d through lever 13b to a position where the center of armature 13d is located above the center of the coil of solenoid 13e sufficiently to cause this coil when energized to move the armature 13d downwardly through a distance sufficient to move the valve member 13a upwardly to cut off communication between conduit 14 and chamber 16a. Thus, since in the unenergized position shown in Fig. 2 the conduit 14 communicates with chamber 16a, the piston 12 will move to the right with the position of the parts shown in Fig. 2. As was mentioned above, the timer 15 energizes the solenoid 13e for a shorter period of time than it is unenergized. For example, the timer 15 may be set to energize the solenoid of valve 13 for a period of 2.8 seconds while its solenoid remains unenergized for 3 seconds. As a result the stroke of piston 12 to the right, as viewed in Fig. 2, is greater than its stroke to the left, and therefore while the carriage 5 is reciprocated it is also advancing to the left, as viewed in Fig. 1, while the reciprocating piston 12 advances to the right.

A second piston 18, forming part of a braking means, is connected by rod 17a to the piston rod 17 so that the pistons 12 and 18 reciprocate together, this piston 18 being located in a second cylinder 19 filled with oil or any other suitable braking fluid and having inner portions 19a and 19b of different diameters. As is apparent from Fig. 2, the right portion 19b of cylinder 19 is of a larger diameter than the left portion 19a thereof, and the cylinder 19 is provided with a shoulder 22 between the inner portions 19a and 19b thereof. The piston 18 has a diameter corresponding to that of the smaller portion 19a of cylinder 19 and reciprocates in portion 19a. A conduit 20 provides a path of communication between portions 19a and 19b of cylinder 19, and an adjustable needle valve 21 is connected into the conduit 20 to restrict the flow of fluid therethrough so as to adjust the braking force. Thus, during reciprocation of pistons 12 and 18 the braking fluid moves back and forth through conduit 20 and the needle valve 21 restricts the flow of this braking fluid so as to produce the desired braking force.

As was mentioned above, the timer 15 is set to give the piston 12 a stroke to the right, as viewed in Fig. 2, which is longer than its reverse stroke to the left, and as a result the piston 18 which moves together with the piston 12 advances toward the right end wall of cylinder 19, as viewed in Fig. 2. Thus, the pistons are reciprocated together with the braking force provided by elements 20 and 21 until the piston 18 moves to the right, as viewed in Fig. 2, beyond the shoulder 22. At this moment, the chambers 19a and 19b of cylinder 19 are suddenly placed in direct communication with each other, and as a result the braking force is suddenly reduced to a very large extent, this braking force, in fact, being substantially eliminated at this moment. Therefore, at the moment when the piston 18 moves beyond shoulder 22 the sudden release of the braking force will cause the full force of the fluid pressure in chamber 16a to be substantially applied to the piston 12 so that the carriage 5 is at this moment moved to the left when a suddenly increased force which causes the parts A and B to be pushed together with the equivalent of an extremely forceful hammer blow or the like. This is the last step in the welding process at which the two parts to be welded are pushed together with an extremely large force to cause the almost molten parts thereof to be upset and to fuse together and form the equivalent of a solid piece of metal.

As is apparent from Fig. 2, the timer 15 and solenoid 13e are electrically connected into a circuit which includes a manually operable switch 25 and a switch 24, any suitable source of current being connected in any known way to this circuit. The switch 25 when it is not held manually closed by the operator remains open either by gravity or any suitable spring, and this switch 25 simply bridges the conductors leading to the switch 24 when the switch 25 is manually closed. The switch 24 has a left stationary contact, as viewed in Fig. 2, and a right movable contact urged by a spring or the like into engagement with the stationary contact. Thus, while switch 24 remains closed and while switch 25 remains open, the welding process proceeds in the manner described above with the reciprocation of the pistons 12 and 18 in cylinders 11 and 19, respectively. However, at the end of the welding process when the piston 18 moves beyond the shoulder 22, a collar 23 fixed to the rod 17a engages the movable contact arm of switch 24 to open this switch, and in this way the solenoid 13e is maintained unenergized so that the valve 13 is maintained in the position shown in Fig. 2 at this time, and the force in chamber 16a urging piston 12 to the right, as viewed in Fig. 2, is maintained. In this way the parts to be welded are pushed together at the end of the welding process and are not pulled apart from each other.

At the end of the welding operation the source of fluid pressure communicating with conduit 14 may be cut off and the welded parts are then removed from the machine. Then the switch 25 is closed to energize the solenoid 13e and the source of fluid is again supplied to the conduit 14. The switch 25 is maintained closed by the operator to maintain solenoid 13e energized until the carriage 5 is again in its starting position, and then the switch 25 is released by the operator. It will be noted that while the operator maintains the switch 25 closed the piston 12 moves to the left, as viewed in Fig. 2, and the collar 23 moves to the left away from the switch 24 so that the latter is automatically closed. Then the timer is in a position to repeat the cycle of operations described above.

In starting the operations, the pieces A and B are fixed on the machine and a spacer piece of predetermined length is placed therebetween while the pieces A and B are brought into contact with the ends of this spacer piece. Thus the distance between the work pieces is regulated at the start of the operations, and the distance between pistons 18 and 12 may be regulated to produce the proper operations depending on the length of this spacer piece. Thus, the left end of rod 17, as viewed in Fig. 2, is provided with an internally threaded bore 26 into which the right threaded end of rod 17a threadedly extends. The left end of rod 17a is provided with a hand wheel 27 which may cooperate with any suitable scale so that by turning hand wheel 27 the rod 17a will be turned to thread the latter into or out of rod 17 and thus adjust the position of piston 18 in the cylinder 19 to produce the release of the braking force at the proper moment in accordance with the relative positions of the work pieces. The rod 17 due to its connection to the lever 10 cannot turn about its axis so that turning of hand wheel 27 will produce the desired relative movement between rod members 17 and 17a. Thus, the distance $a$ between pistons 18 and 12 may be regulated to produce the desired cycle of operations.

It will be noted that the cylinders 11 and 19 are coaxial with each other and have a common wall therebetween. Moreover, the piston rod 17a is guided through the left end wall of cylinder 19, as viewed in Fig. 2, the piston 18 being held against axial movement with respect to rod 17a by a pair of collars or the like fixed to rod 17a and located against the opposite faces of piston 18. Furthermore, although rod 17a is guided by the end walls of cylinder 19 after piston 18 moves to the right of shoulder 22, as viewed in Fig. 2, it is desirable to continue to guide the piston 18 by the smaller cylinder portion 19a, and for this purpose the piston 18 is provided with fins 28 extending axially from the piston 18 to engage cylinder portion 19a after piston 18 has moved to the right of shoulder 22, as viewed in Fig. 2.

Although a preferred construction in accordance with the present invention has been described above, it is apparent that the invention may be practiced with other constructions. For example, instead of single pistons 12 and cylinder 11, it is possible to provide a pair of such pistons and cylinders to double the guiding force. Moreover, the multiple-way valve 13 may be replaced through a similarly operating combination of several valves, and instead of being electrically controlled the valve can be hydraulically or pneumatically controlled. Also, it is possible to connect with the conduit 20 a reservoir for the braking fluid.

It will be understood that each of the elements described above, or two or more together, may also find a useful application in other types of flash welding machines differing from the types described above.

While the invention has been illustrated and described as embodied in control apparatus for flash welding machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a flash welding machine, in combination, carriage means adapted to carry a work piece; support means supporting said carriage means for reciprocating movement; a pair of cylinders; a pair of pistons respectively mounted in said cylinders for reciprocating movement therein; rod means interconnecting said pistons for movement together and connected to said carriage means for reciprocating the latter during reciprocation of said pistons in said cylinders; control means operatively connected to one of said cylinders for giving the piston therein a stroke in one direction greater than its stroke in the reverse direction so that said carriage is advanced during its reciprocation; first means connected to the other of said cylinders and forming a restricted path of fluid flow between opposite faces of the piston in said other cylinder, whereby the movement of said pistons is braked; and second means connected to said other cylinder and forming a path of substantially unrestricted fluid flow between opposite faces of the piston in said other cylinder when the latter piston has advanced to a predetermined extent in said other cylinder.

2. In a flash welding machine, in combination, carriage means adapted to carry a work piece; support means supporting said carriage means for reciprocating movement; a first cylinder; a first piston located in said first cylinder and connected to said carriage for reciprocating the latter during movement of said first piston in said first cylinder; control means connected to said first cylinder for giving the piston therein a stroke in one direction greater than its stroke in the reverse direction so that said carriage is advanced while being reciprocated; a second cylinder having a pair of successive inner portions of different diameters joined by a shoulder in said second cylinder; a second piston located in the smaller of said inner portions of said second cylinder and connected to said first piston for movement therewith; conduit means extending between said inner portions of said second cylinder for directing fluid from one to the other of said inner portions and back again during reciprocation of said second piston; and restricting means in said conduit means for restricting the flow of fluid therethrough so as to brake the movement of said first piston until said second piston moves beyond said shoulder into the larger of said portions of said second cylinder.

3. In a flash welding machine, in combination, carriage means adapted to carry a work piece; support means supporting said carriage means for reciprocating movement; a pair of cylinders; a pair of pistons respectively mounted in said cylinders for reciprocating movement therein; rod means interconnecting said pistons for movement together and connected to said carriage means for reciprocating the latter during reciprocation of said pistons in said cylinders; control means operatively connected to one of said cylinders for giving the piston therein a stroke in one direction greater than its stroke in the reverse direction so that said carriage is advanced during its reciprocation; restricting means operatively connected to the other of said cylinders for restricting the flow of fluid from one to the other of the sides of the piston in said other cylinder for braking the movement of said pistons; means cooperating with said piston in said other cylinder for substantially reducing the influence of said restricting means on the latter piston when said carriage has been advanced to a predetermined extent; and adjusting means forming part of said rod means and located between said pistons for adjusting the position of said piston in said other cylinder so as to control the moment when said second means forms said path of substantially unrestricted fluid flow.

4. In a flash welding machine, in combination, carriage means adapted to carry a work piece; support means supporting said carriage means for reciprocating movement; a first cylinder; a first piston located in said first cylinder and connected to said carriage for reciprocating the latter during movement of said first piston in said first cylinder; control means connected to said first cylinder for giving the piston therein a stroke in one direction greater than its stroke in the reverse direction so that said carriage is advanced while being reciprocated; a second cylinder having a pair of successive inner portions of different diameters joined by a shoulder in said second cylinder; a second piston located in the smaller of said inner portions of said second cylinder and connected to said first piston for movement therewith; conduit means extending between said inner portions of said second cylinder for directing fluid from one to the other of said inner portions and back again during reciprocation of said second piston; restricting means in said conduit means for restricting the flow of fluid therethrough so as to brake the movement of said first piston until said second piston moves beyond said shoulder into the larger of said portions of said second cylinder; and adjusting means connected to said second piston for adjusting the position thereof in said second cylinder to control the moment when said second piston moves beyond said shoulder.

5. In a flash welding machine, in combination, carriage means adapted to carry a work piece; support means supporting said carriage means for reciprocating movement; a first cylinder; a first piston located in said first cylinder and connected to said carriage for reciprocating the latter during movement of said first piston in said first cylinder; control means connected to said first cylinder for giving the piston therein a stroke in one direction greater than its stroke in the reverse direction so that said carriage is advanced while being reciprocated; a second cylinder coaxial with said first cylinder and having a pair of successive inner portions of different diameters joined by a shoulder in said second cylinder; a second piston located in the smaller of said inner portions of said second cylinder; a first rod portion connected to said first piston; a second rod portion connected to said second piston and threadedly engaging said first rod portion; conduit means extending between said inner portions of said second cylinder for directing fluid from one to the other of said inner portions and back again during reciprocation of said second piston; restricting means in said conduit means for restricting the flow of fluid therethrough so as to brake the moveemnt of said first piston until said second piston moves beyond said shoulder into the larger of said portions of said second cylinder; and manually operable turning means connected to said second rod portion for turning the latter with respect to said first rod portion so as to adjust distance between said first and second pistons and thereby control the moment at which said second piston moves beyond said shoulder.

6. In a flash welding machine, in combination, carriage means adapted to carry a work piece; support means supporting said carriage means for reciprocating movement; a pair of cylinders; a pair of pistons respectively mounted in said cylinders for reciprocating movement therein; rod means interconnecting said pistons for movement together and connected to said carriage means for reciprocating the latter during reciprocation of said pistons in said cylinders; pneumatic control means operatively connected to one of said cylinders for giving the piston therein a stroke in one direction greater than its stroke in the reverse direction so that said carriage is advanced during its reciprocation; first means connected to the other of said cylinders and forming a restricted path of hydraulic fluid flow between opposite faces of the piston in said other cylinder, whereby the movement of said pistons is braked; and second means connected to said other cylinder and forming about the piston therein an annular path of substantially unrestricted fluid flow between opposite faces of the latter piston when said latter piston has advanced to a predetermined extent in said other cylinder.

7. In a flash welding machine, in combination, carriage means adapted to carry a work piece; support means supporting said carriage means for reciprocating movement; a first cylinder; a first piston located in said first cylinder and connected to said carriage for reciprocating the latter during movement of said first piston in said first cylinder; control means connected to said first cylinder for giving the piston therein a stroke in one direction greater than its stroke in the reverse direction so that said carriage is advanced while being reciprocated; a second cylinder having a pair of successive inner portions of different diameters joined by a shoulder in said second cylinder; a second piston located in the smaller of said inner portions of said second cylinder and connected to said first piston for movement therewith; fin means fixed to said second piston and extending axially therefrom along the inner surface of said smaller inner portion of said second cylinder for guiding said second piston even when it is located beyond said smaller inner portion of said second cylinder; conduit means extending between said inner portions of said second cylinder for directing fluid from one to the other of said inner portions and back again during reciprocation of said second piston; and restricting means in said conduit means for restricting the flow of fluid therethrough so as to brake the movement of said first piston until said second piston moves beyond said shoulder into the larger of said portions of said second cylinder.

References Cited in the file of this patent
UNITED STATES PATENTS

| | | |
|---|---|---|
| 1,676,282 | Phelps | July 10, 1928 |
| 2,187,452 | Gordon et al. | Jan. 16, 1940 |
| 2,298,051 | Gordon et al. | Oct. 6, 1942 |
| 2,324,944 | Millwood | July 20, 1943 |